United States Patent [19]

Simancik

[11] Patent Number: 4,660,443
[45] Date of Patent: Apr. 28, 1987

[54] TRANSMISSION SELECTOR LEVER ASSEMBLY

[75] Inventor: Carl D. Simancik, Troy, Mich.

[73] Assignee: General Motors Corporation, Detroit, Mich.

[21] Appl. No.: 824,636

[22] Filed: Jan. 31, 1986

[51] Int. Cl.4 .............. B60K 41/26; B60R 25/06; G05G 9/12
[52] U.S. Cl. .................................. 74/878; 70/248; 74/473 R; 74/475; 74/538; 192/4 A
[58] Field of Search ............ 74/473 R, 475, 538, 74/850, 878; 192/1, 2, 4 A; 70/248

[56] References Cited

U.S. PATENT DOCUMENTS

| | | | |
|---|---|---|---|
| 3,765,262 | 10/1973 | Mendenhall et al. | 70/248 X |
| 4,270,624 | 6/1981 | Jessop | 74/878 X |
| 4,474,085 | 10/1984 | Devogelaere et al. | 70/248 X |
| 4,520,640 | 6/1985 | Kramer | 70/248 |

Primary Examiner—Allan D. Herrmann
Attorney, Agent, or Firm—Donald F. Scherer

[57] ABSTRACT

A transmission shift tower selector lever assembly has a base member slidably supporting a bracket. A shift lever is pivotally mounted on the bracket and linearly movable therewith to the Drive, Neutral and Reverse transmission operation positions. A lock-out lever pivotally mounted on the bracket is connectible with the shift lever to prevent pivoting thereof relative to the bracket during linear movement of the bracket between the Drive and Reverse transmission positions. The lock-out lever pivots during movement of the bracket between the Reverse and Park positions to free the shift lever for pivotal movement relative to the bracket and base member to establish the Park position. A Park/Lock lever is pivotally mounted on the base member and. is engaged by the bracket when the bracket and shift lever are moved between the Drive and Reverse positions. The Park/Lock lever is disengaged therefrom during movement between the Reverse and Park positions to permit pivoting of the Park/Lock lever on the base member. A flexible cable connects the Park/Lock to an ignition lock to prevent attainment of ignition locking prior to the transmission shift lever being place in the Park position. A flexible cable also connects the shift lever to a power transmission for shifting thereof between the transmissions positions. A detent mechanism on the shift lever cooperates with the Park/Lock lever and a detent lever on the base member to prevent movement of the shift lever from the Park position when the ignition is locked. The detent mechanism is operated linearly by a rotary operator knob disposed on the shift lever.

3 Claims, 10 Drawing Figures

TRANSMISSION SELECTOR LEVER ASSEMBLY

This invention relates to transmission controls and more particularly to shift selector assemblies.

BACKGROUND OF THE INVENTION

Prior art shift selector assemblies provide for pivotal movement of the shift lever relative to a stationary base. These devices need sufficient space for arcuate movement of the operator handle or knob which can extend some distance from the lever pivot point. The space required for the arcuate movement restricts or limits the location at which the shift lever can be disposed.

SUMMARY OF THE INVENTION

The present invention seeks to reduce the space needed to accommodate movement of the operator handle so as to permit the selector assembly to be mounted in various locations and at various attitudes. In particular, the present invention permits linear movement rather than pivotal movement of the shift lever during manipulation from the Reverse position through Neutral to the forward drive positions. To provide the operator with additional mechanical advantage while pulling the transmission control out of the Park position, the shift lever is pivotally actuated during movement between the Reverse and Park positions.

It is therefore an object of this invention to provide an improved transmission shift tower selector assembly wherein the operator lever is moved linearly relative to a mounting base between the Reverse, Neutral and Forward Drive positions and is moved pivotally between the Reverse and Park positions.

It is another object of this invention to provide an improved transmission shift tower wherein the operator lever is mounted pivotally on a bracket by a pivot pin and is secured for linear movement therewith through a lock-out device which lock-out device is disengaged during linear movement between the Reverse and Park positions to permit pivoting of the shift lever relative to a stationary base when the operator shifts to the Park position.

It is a further object of this invention to provide an improved shift tower selector assembly wherein the operator lever is moved linearly relative to a mounting base between the Reverse and forward drive positions and is moved pivotally between the Reverse and Drive positions and also wherein a detent mechanism is provided to assist in maintaining the position selected and further including a rotary operated knob assembly disposed on the shift lever to control linear movement of one portion of the detent mechanism.

These and other objects and advantages of the present invention will be more apparent from the following specification and drawings.

IN THE DRAWINGS

DETAILED DESCRIPTION OF THE PREFERRED EMBODIMENT

Figure 1:
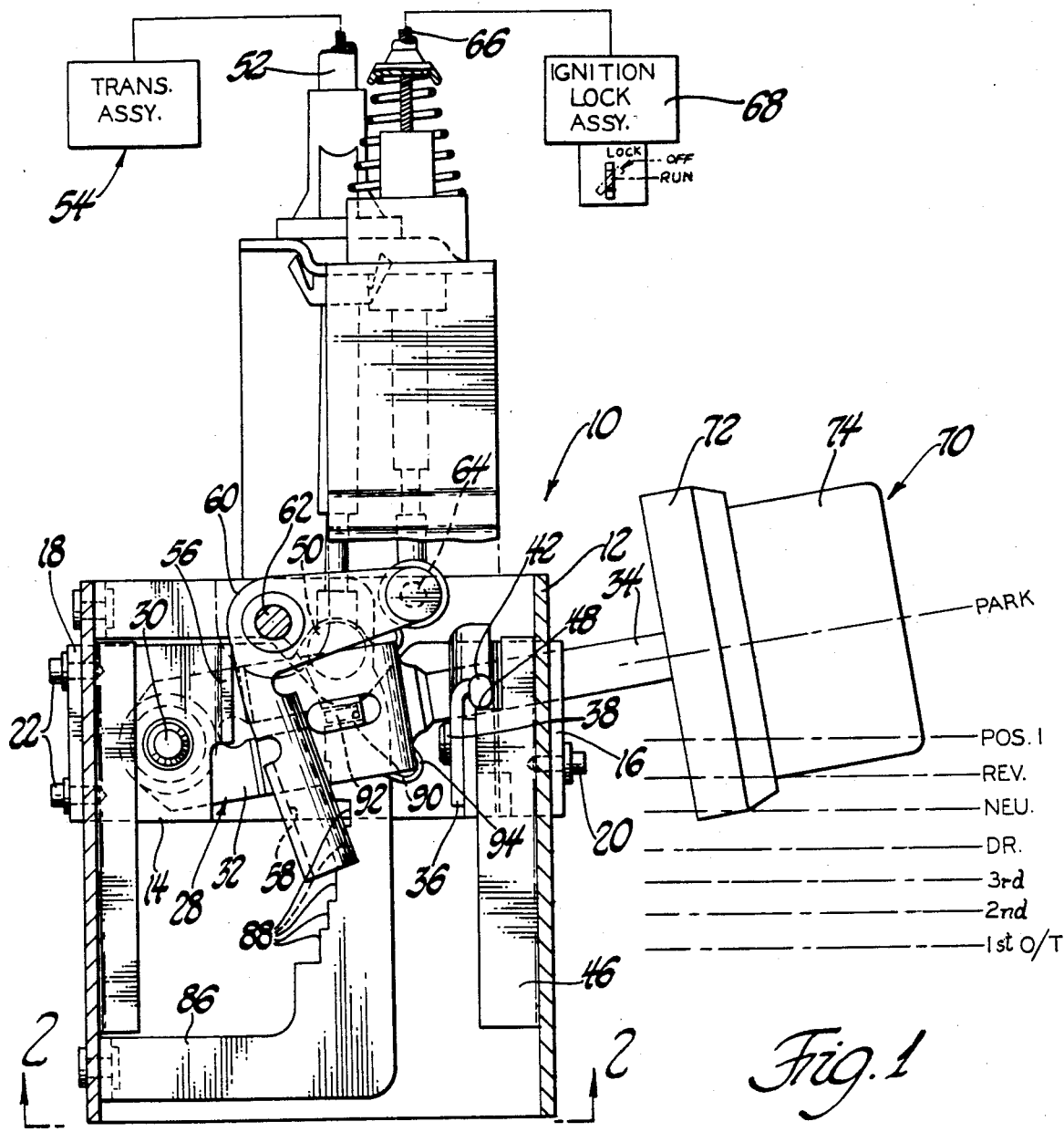
FIG. 1 is a plan view of a transmission selector assembly.

Referring to the drawings, wherein like characters represent the same or corresponding parts throughout the several views, there is seen in FIGS. 1 through 5 a transmission shift tower selector assembly 10 which includes a base member 12 adapted to be secured to a vehicle body panel, not shown. A support bracket 14 is mounted in a pair of bearings or bushings 16 and 18 by a plurality of fasteners 20 and 22, respectively. The bushings 16 and 18 are slidably disposed in respective slots 24 and 26 formed in the base member 12.

Figures 2, 3:
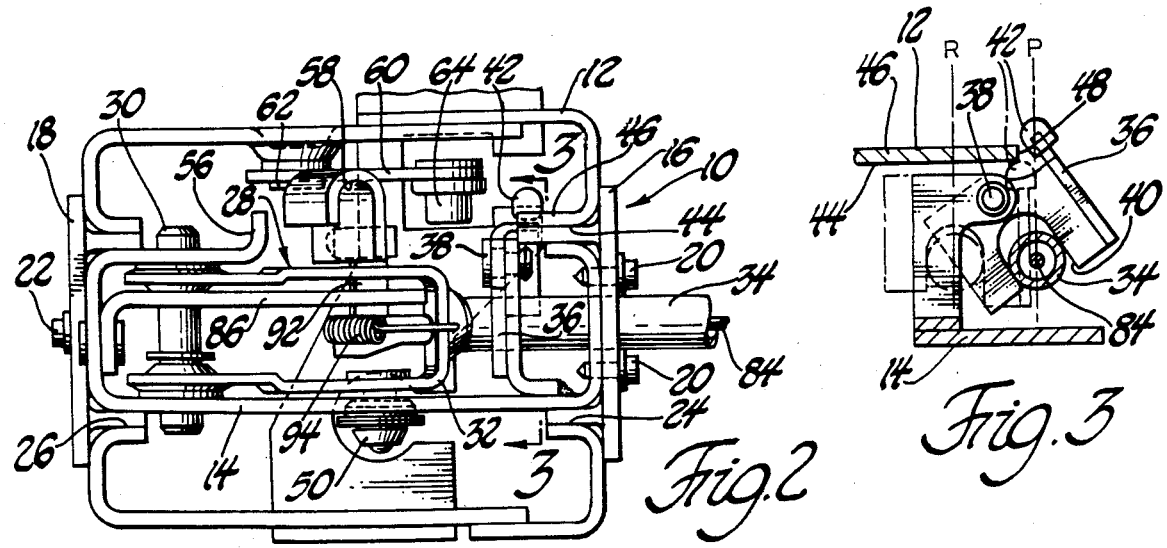
FIG. 2 is a view taken along line 2—2 of FIG. 1.
FIG. 3 is a view taken along line 3—3 of FIG. 2.

The bracket 14 pivotally supports a shift lever assembly 28 on a pivot pin 30. The shift lever assembly 28 includes a yoke 32 which is pivotally mounted on the pin 30 and a tubular operator handle or shift lever 34 which is secured to the yoke 32. the tubular handle 34 extends through the bracket 14 and the bushing 16. The bracket 14 has pivotally mounted thereon a lock-out lever 36. The lock-out lever 36 is supported on a pivot pin 38 and has formed therein a slot 40 which, as best seen in FIG. 3, is adapted to locate the tubular shift lever 34. A protuberance or abutment 42 formed on the lock-out lever 36 is adapted to contact an inner surface 44 of a wall portion 46 of the base member 12, as seen in phantom line in FIG. 3.

Figure 4:
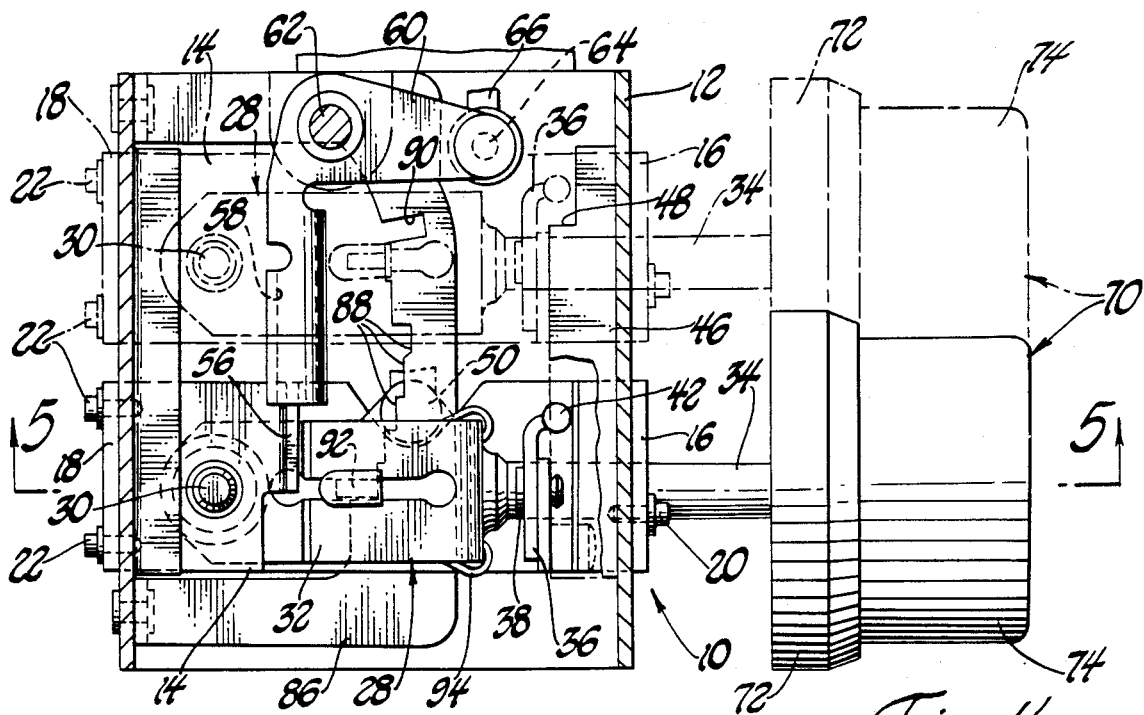
FIG. 4 is an elevational view similar to FIG. 1 showing the selector lever at the extreme linear travel limits.

The shift lever 34 through the cooperation of the slidable bracket 14 and the lock-out lever 36 is adapted to move linearly relative to the base member 12 between the First or Low drive position and the Reverse drive position, as seen in FIGS. 1 and 4. During movement between these positions, the lock-out lever 36 through the abutment 42 prevents pivoting of the shift lever assembly 28 about the pivot pin 30. As the shift lever assembly 28 is moved linearly between the Reverse position and position 1, as shown in FIG. 1, the abutment 42 will align with a cutout 48 formed in the wall 46. This will permit the shift lever assembly 28 to be free to pivot about the pin 30 to attain the Park position as seen in FIG. 1. The lock-out lever 36 is shown in the pivoted position and the solid line in FIG. 3.

The shift lever assembly 28 includes a cable connector 50 which is connected to a flexible cable assembly 52 adapted to be connected to a conventional automatic shifting transmission assembly 54. Such transmission assemblies are well-known devices and it is not believed that a detailed description of these mechanisms is required at this point.

The bracket 14 has integrally formed therewith an alignment extension arm 56 which travels in a channel 58 formed in a Park/Lock lever 60 while the transmission selector lever is manipulated from the low forward drive position to the Reverse position. However, when the shift lever assembly 28 and bracket 14 are moved to position 1, the extension 56 is removed from the channel 58. This will permit the Park/Lock lever 60 to be pivoted about pin 62.

To control pivoting of the Park/Lock lever 60 it has formed thereon a cable connector 64 which is connected to a flexible cable 66 which in turn is connected to an ignition locking assembly 68 such as that shown in U.S. Pat. Nos. 4,520,640 issued to Kramer June 4, 1985, or 4,270,624 issued to Jessop June 2, 1981. Both of these patents disclose ignition locking assemblies which are adapted to work with controls that require the transmission to be placed in the Park position prior to the ignition being manipulated to the Lock setting. When the shift lever assembly 28 is pivoted to the Park position, the Park/Lock lever 60 is free to pivot about pin 62 when the ignition lock assembly 68 is manipulated to the Lock setting.

Figure 8:
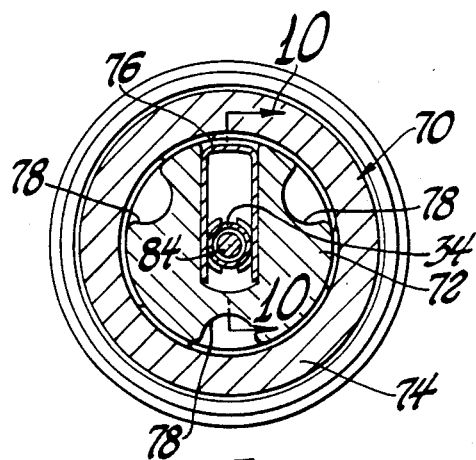
FIG. 8 is a view taken along line 8—8 of FIG. 7.

The tubular handle 34 has disposed on the end thereof an operator handle or knob assembly, generally designated 70, which includes an inner knob 72 and an outer knob 74. The inner knob 72 is disposed on the shift tube 34 and secured thereto by a retainer 76 as best seen in FIG. 8. The inner knob 72 has formed therein a plurality of cam tracks 78 which are engaged by a plurality of cam followers 80 formed on the outer knob 74. The cam tracks 78 are designed such that rotation of the outer knob 74 will result in linear movement of the knob 74 relative to the tubular handle 34.

Figure 5:
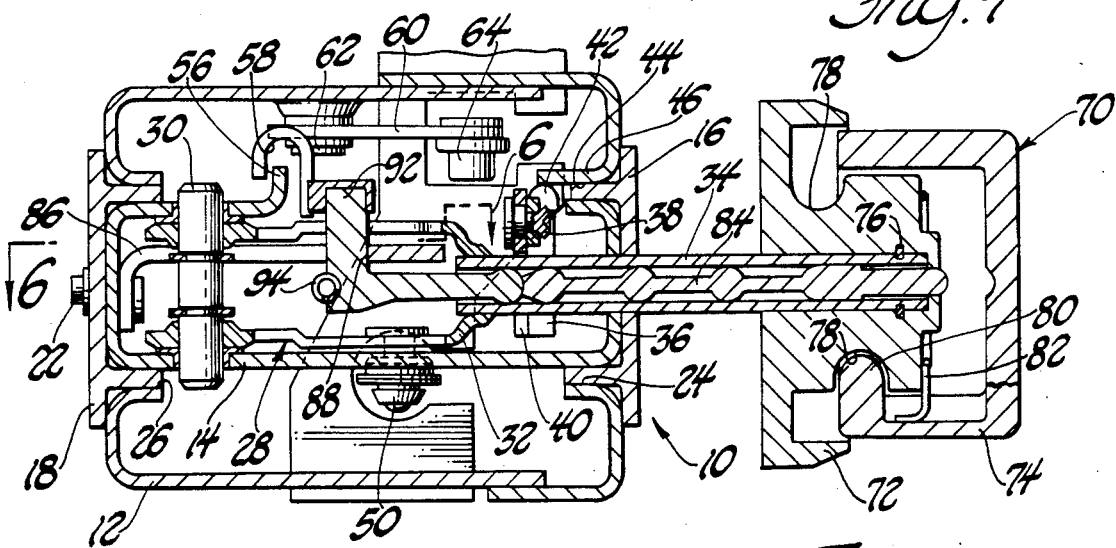
FIG. 5 is a view taken along line 5—5 of FIG. 4.
Figure 7:
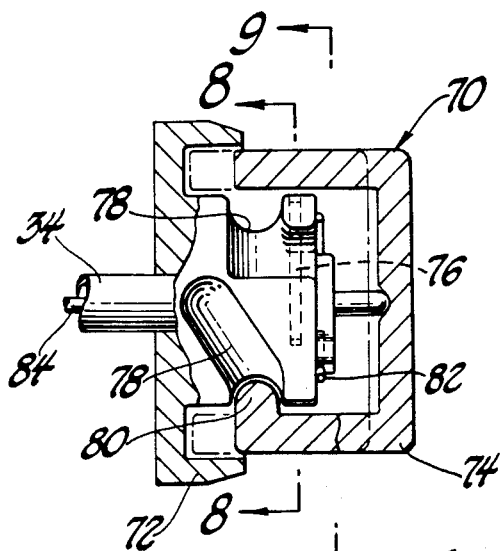
FIG. 7 is a partial sectional view of the operator knob secured to the shift lever handle.
Figure 9:
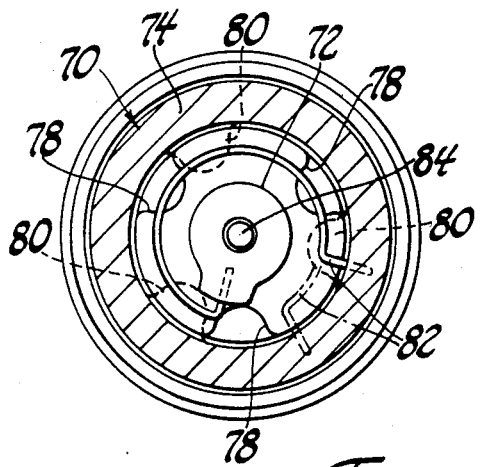
FIG. 9 is a view taken along line 9—9 of FIG. 7.

The inner knob 72 and outer knob 74 are connected by a spiral spring 82, as best seen in FIG. 9, which is adapted to maintain the outer knob 74 in its most outward extended position relative to the inner knob 72. thus, whenever the outer knob 74 is freed by the operator, it will return to the "at rest" position shown in FIGS. 5 and 7.

Figure 6:
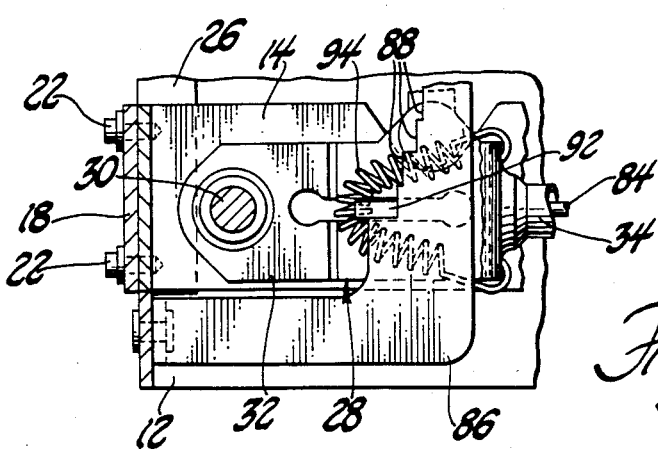
FIG. 6 is a view taken along line 6—6 of FIG. 5.
Figure 10:
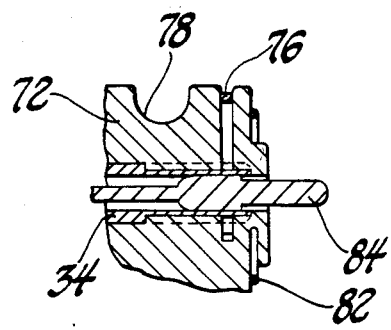
FIG. 10 is a view taken along line 10—10 of FIG. 8.

The shift tower assembly 10 also includes a detent mechanism which is comprised of a detent rod 84 disposed in the shift lever tube 34 and a detent plate 86 secured to the base 12. The detent plate 86 has a plurality of steps, such as 88, formed thereon and a notch 90 is also formed in the plate 86. The notch 90 is the park retention notch and the steps 88 represent the drive positions of reverse through low forward drive. The detent rod 84 has secured thereto or formed integrally therewith a detent pawl 92 which is urged into abutment with the detent plate 86 by a spring 94, as best seen in FIGS. 5 and 6. Thus, the detent rod 84 is continuously urged toward the outer knob 74 to its fully extended position seen in FIGS. 7 and 10. The linear movement of the outer knob 74 resulting from operator rotation thereof will cause linear movement of the detent rod 84 and pawl 92 such that shifting between the various transmission drive positions can be accomplished.

When the transmission position Park is selected, the pawl 92 will be forced into the notch 90 by the spring 94 when the operator releases the knob 74. If, at this time, the operator turns the ignition to the Lock position, the Park/Lock lever 60 will be pivoted to the position shown in FIG. 1 and will prevent the pawl 92 from being removed from the slot 90. The forces on the ignition lock cable 66 are such that the operator cannot achieve sufficient linear force on the detent rod 84 through rotary motion of the outer knob 74 to force pivoting of the Park/Lock lever 60. Thus, the transmission selector lever is maintained in the Park position by the pawl 92, the detent plate 86 and the shift lever assembly 28 thereby preventing the transmission from being removed from the Park position prior to the ignition lock being manipulated out of the Lock position.

The rotary manipulation of the outer knob 74 permits the shift lever assembly 28 to be mounted at a plurality of locations in a vehicle, such as on the instrument panel, the steering column or the vehicle floor pan while maintaining a simple motion for the operator when manipulation of the lever is desired. With the rotary motion knob construction, it is only necessary that the operator be able to grasp the outer knob between the thumb and forefinger to operate the detent mechanism as opposed to more conventional detent mechanisms which require gripping a handle and either linear thumb pressure or flexing of the fingers to manipulate the detent mechanism.

The linear motion of the shift lever assembly throughout the range of drive positions will permit the vehicle designer to place the transmission shift lever assembly at a variety of locations since the space requirement is substantially less than that required for pivoting-type shift lever mechanisms.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A shift tower for a vehicle having an automatic transmission shiftable to Park, Neutral, Reverse and Drive transmission positions, and an ignition key movable to Run, Off and Lock positions; said shift tower comprising: a base member; a support bracket; a pair of bushings secured to said bracket and slidably supporting said bracket in said base member, said bracket being linearly movable in said base member to said transmission positions; shift lever means pivotally mounted on said bracket and being linearly movable therewith to at least the Drive, Reverse and Neutral transmission positions; a lock-out lever pivotally connected to said bracket and including an abutment protuberance and a slot which is operatively connected with said shift lever means, said base member having a wall contacted by said abutment protuberance to position said lock-out lever to maintain said shift lever means and prevent pivoting of said shift lever means relative to said bracket during linear movement of said bracket between Drive and Reverse, said abutment being out of contact with said wall during movement of said bracket between Reverse and Park to permit pivoting of said shift lever means relative to said bracket and base member to attain said Park position; a park lock lever pivotally mounted on said base member and being operatively engaged with said bracket when said bracket and shift lever means are moved between said Drive and Reverse and being disengaged therefrom during movement between said Reverse and Park positions to permit pivoting thereof on said base member; means for connecting said park lock to said ignition to prevent attainment of the Lock position prior to the transmission shift lever being placed in the Park position; means for connecting said shift lever means to the transmission for shifting thereof between the transmission positions; and means on said shift lever means cooperating with said park lock lever and said base member for preventing movement of said shift lever means from said Park position when said ignition key is in said Lock position.

2. A shift tower for a vehicle having an automatic transmission shiftable to Park, Neutral, Reverse and Drive transmission positions, and an ignition key movable to Run, Off and Lock positions; said shift tower comprising: a base member; a support bracket; a pair of bushings secured to said bracket and slidably supporting said bracket in said base member, said bracket being linearly movable in said base member to said transmission positions; shift lever means pivotally mounted on said bracket and being linearly movable therewith to at least the Drive, Reverse and Neutral transmission positions; a lock-out lever pivotally connected to said bracket and including an abutment protuberance and a slot which is operatively connected with said shift lever means, said base member having a wall contacted by said abutment protuberance to position said lock-out lever to maintain said shift lever means and prevent pivoting of said shift lever means relative to said bracket during linear movement of said bracket between Drive and Reverse, said abutment being out of contact with said wall during movement of said bracket between Reverse and Park to permit pivoting of said shift lever means relative to said bracket and base member to attain said Park position; a park lock lever pivotally mounted on said base member and being operatively engaged with said bracket when said bracket and shift lever means are moved between said Drive and Reverse and being disengaged therefrom during movement between said Reverse and Park positions to permit pivoting thereof on said base member; means for connecting said park lock to said ignition to prevent attainment of the Lock position prior to the transmission shift lever being placed in the Park position; means for connecting said shift lever means to the transmission for shifting thereof between the transmission positions; detent means on said shift lever means cooperating with said park lock lever and said base member for preventing movement of said shift lever means from said Park position when said ignition key is in said Lock position; and knob means disposed on said shift lever for operating said detent means and including an inner knob and an outer knob, said inner knob having cam track means, said outer knob having follower means engaging said cam track means, said outer knob means being rotatable by an operator from a rest position, said cam track means and follower means causing said outer knob and said detent means to move linearly relative to said shift lever means, and return spring means operatively connected between said inner knob and outer knob to return said outer knob to the rest position after operation.

3. A shift tower for a vehicle having an automatic transmission shiftable to Park, Neutral, Reverse and Drive transmission positions, and an ignition key movable to Run, Off and Lock positions; said shift tower comprising: a base member; a support bracket; a pair of bushings secured to said bracket and slidably supporting said bracket in said base member, said bracket being linearly movable in said base member to said transmission positions; shift lever means pivotally mounted on said bracket and being linearly movable therewith to at least the Drive, Reverse and Neutral transmission positions; a lock-out lever pivotally connected to said bracket and including an abutment protuberance and a slot which is operatively connected with said shift lever means, said base member having a wall contacted by said abutment protuberance to position said lock-out lever to maintain said shift lever means and prevent pivoting of said shift lever means relative to said bracket during linear movement of said bracket between Drive and Reverse; means for connecting said shift lever means to the transmission for shifting thereof between the transmission positions; detent means on said base and on said shift lever means cooperating to position said shift lever means in said transmission positions; and knob means disposed on said shift lever for operating said detent means on said shift lever means relative to said detent means on said base to permit shifting by the operator from Neutral to Reverse and from Reverse to Park, said knob means including an inner knob and an outer knob, said inner knob having cam track means, said outer knob having follower means engaging said cam track means, said outer knob means being rotatable by an operator from a rest position, said cam track means and follower means causing said outer knob and said detent means to move linearly relative to said shift lever means, and return spring means operatively connected between said inner knob and outer knob to return said outer knob to the rest position after operation.

* * * * *